Jan. 28, 1936.　　　　　F. SEITZ　　　　　2,028,999
JACKING APPARATUS FOR MOTOR VEHICLES
Filed Nov. 13, 1934　　　3 Sheets-Sheet 3
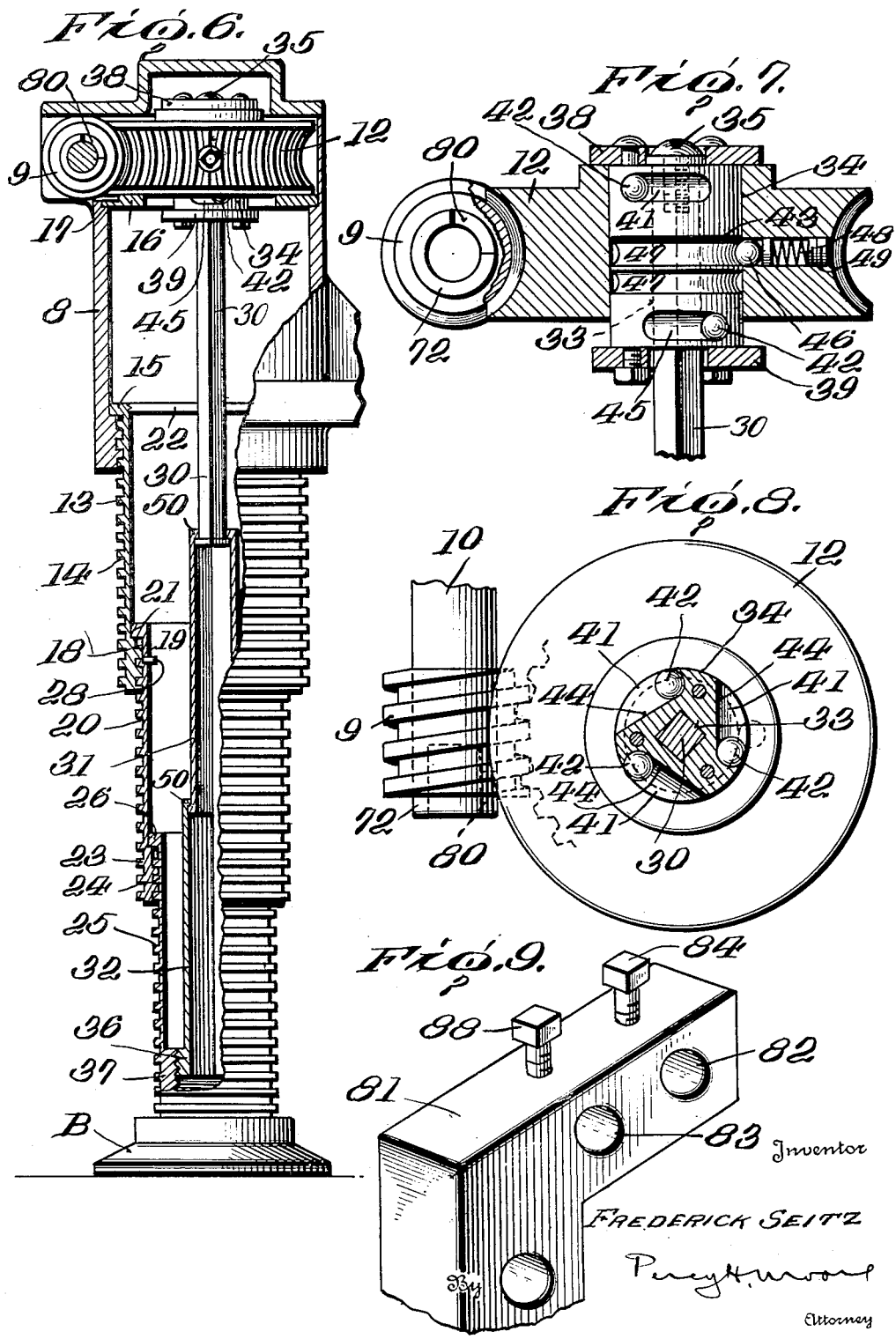
Inventor
FREDERICK SEITZ
Attorney Patented Jan. 28, 1936

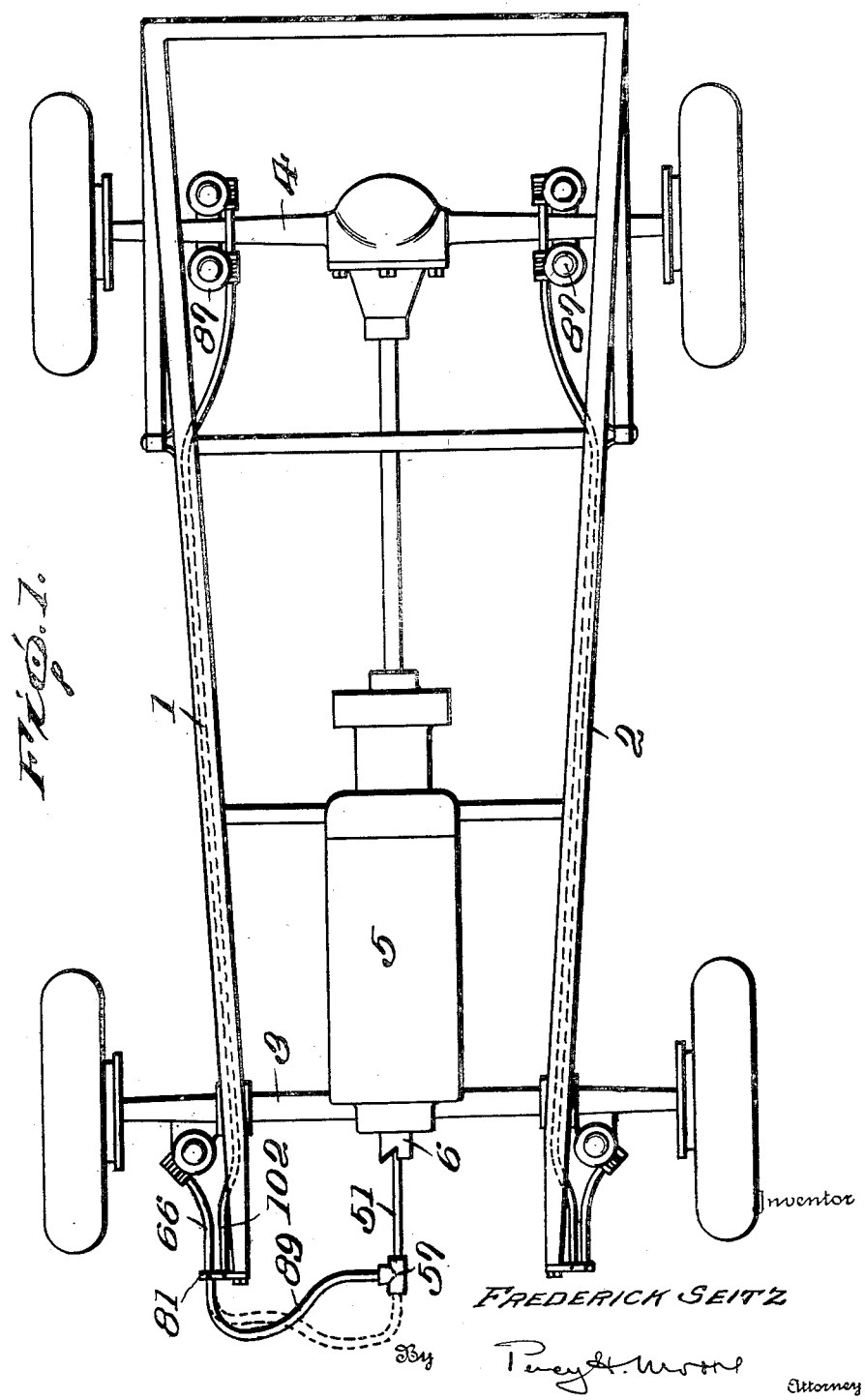

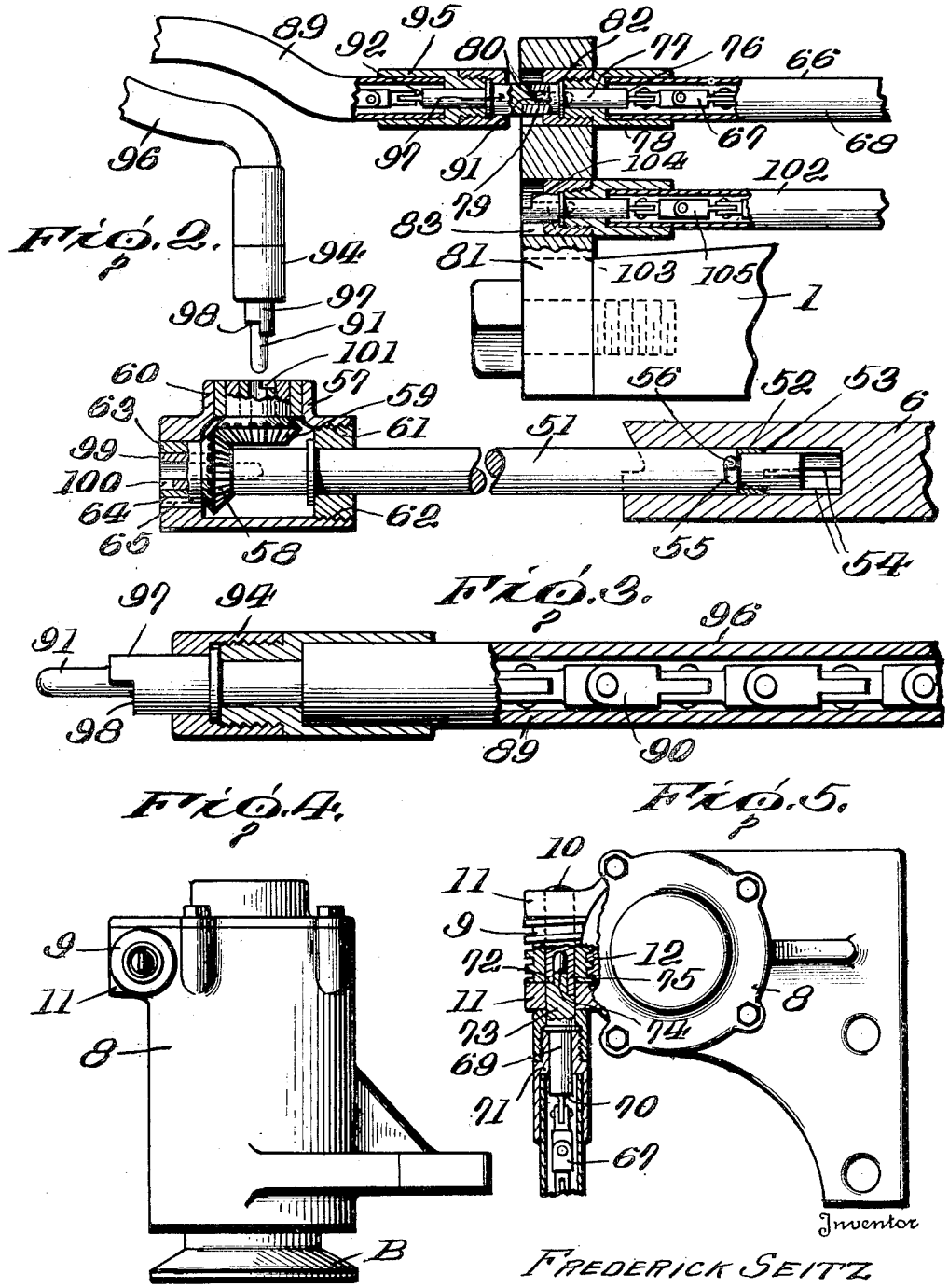

2,028,999

UNITED STATES PATENT OFFICE 2,028,999

JACKING APPARATUS FOR MOTOR VEHICLES

Frederick Seitz, Albany, N. Y.

Application November 13, 1934, Serial No. 752,889

7 Claims. (Cl. 254—86)

My invention relates to an apparatus for raising and lowering motor vehicles, and the like.

Heretofore it has been the practice to equip vehicles with jacks permanently connected to the chassis or axles and adapted to be actuated or driven by a system of shafts and gearing with certain members of the transmission, with a hand operative clutching or connecting device acting to render such connections operative or inoperative. However these devices have proved impractical and unsatisfactory in that expensive mechanical changes or alterations in the vehicle driving mechanism are necessary before this type of jacking system can be applied to the vehicles.

Moreover the ordinary hand operated jack which is a necessary accessory of every present day car is both inconvenient and unsatisfactory in that the occupants of the seats under which the jack is usually kept must necessarily get out of the car in order to have access to the jack, furthermore a great deal of exertion and time must be spent in regulating this type of jack, which is often unsatisfactory due to some mechanical deficiency.

One of the objects of the invention is to equip such vehicles with a plurality of jacks permanently connected to the front and rear axles at points adjacent to the sides, and having a removable power operated auxiliary drive connection between the jacks and the cranking opening in the front end of the crank shaft.

Another object is to provide preferably four lifting and supporting members or jacks comprising telescopic screws rotatably operated to be either independently or collectively operated.

A further object is to provide permanent jacking equipment which is easily and readily applicable with little extra expense to present motor vehicles and the like, without radical changes in the driving mechanism.

Other and more specific objects and advantages will be apparent as the specification is considered in connection with the accompanying drawings, in which:

Figure 1 is a plan view of an automobile chassis with the present invention mounted thereon;

Figure 2 is a plan view, partly in section, of the rigid and flexible shaft drive members;

Figure 3 is a sectional view of the portable flexible shaft;

Figure 4 is a side view of the jack housing;

Figure 5 is a plan view partly in section of the jack housing and permanent shaft therefor;

Figure 6 is an elevation of the jack and telescopic sleeves in extended position;

Figure 7 is a cross section through the worm gear in the jack housing;

Figure 8 is a plan view of the worm and worm gear; and

Figure 9 is a perspective view of the clutch plate.

Referring more particularly to the drawings, wherein similar reference characters refer to similar parts throughout the several views thereof, the reference numerals 1 and 2 designate the longitudinal frame members of the chassis of an automobile, having attached thereto the front axle 3 and the rear axle 4. The motor 5 is suitably supported on the frame and is equipped with the usual crank shaft 6. A plurality of jacks, preferably four in number, are suitably secured to the axles adjacent the inner sides of the wheels, the rear axle being preferably equipped with double jacks of similar construction pivotally mounted thereon in any suitable manner, so as to compensate for inclines, uneven surfaces and the like. Each of the jacks comprises a substantially cylindrical metal casing or housing 8, which is provided with a worm 9, mounted on a shaft 10, journalled in the outwardly extending apertured ears or flanges 11 of the housing 8. The upper portion of the inner wall of the housing is machined to form a seat for a worm gear 12 which intermeshes with the worm 9 and is rotated thereby.

Associated with the casing 8 are a plurality of threaded tubular members telescopically arranged therein. The upper tubular member 13 is externally threaded as at 14, to engage the threads of the casing 8, the upper end of the member 13 being provided with a shoulder portion 15 adapted to limit the downward movement of the member 13 within the casing. A thrust washer 16 adapted to seat on the ridge 17 of the cylinder wall and to be suitably retained in position therein, by screws or the like, serves both as a bearing surface for the gear 12 and as a stop for limiting the upward travel of the member 13. At its lower end the tubular member 13 is internally threaded for a limited distance, as at 18, to mesh with the external threads 19 of the next tubular member 20, the upper end of which is provided with a shoulder portion 21, adapted to limit the downward movement of the member 20, within the member 13, a thrust washer 22, threaded into the top of member 13 serving as a stop for the shoulder 21 to limit the upper movement of the member 20. At its lower end the member 20 is internally threaded for a limited distance as at 23, for engagement with the external threads 24 of the next tubular member 25. The upper end of the member 25 has a shoulder portion 26 which is partly cut down, to contact a pin 28 in the upper part of the wall of member 20 to arrest the upward movement of the member 25. The lower end of the sleeve 25 is provided with a preferably circular, ball bearing, swivel base B, for engaging the ground when the vehicle is raised.

A series of three drive spindle rods 30, 31 and 32 respectively, of suitable length, are slidably arranged in the casing 8 and are adapted to telescopically fit one within the other. The upper drive spindle 30 slidably extends through the bore 33 of a sliding sleeve 34 arranged in the gear 12, and has a collar or flange 35 thereon to limit the downward movement of the rod. The spindle 30 is slidably received in the rod 31, which is likewise slidably received in the outer or lower working spindle rod 32. The lower rod 32 is externally threaded, as at 36, to engage the internal threads 37 of the lower telescopic tubular screw member 25. It will thus be seen that upon rotation of the worm and worm gear 12 the spindle rods will also rotate and as the lower rod 32 threadedly engages the member 25, the screw members and spindles will necessarily be lowered or raised depending upon the direction in which the worm 9 and gear 12 are rotated.

The sliding rotatable sleeve 34 which is adapted to fit in the bore of the gear 12, is of greater length than said bore so that the sleeve will extend a relatively short distance above or below the gear. A preferably integrally formed flange or collar 38, on the upper end of the sleeve 34, and a flange or collar 39 removably connected to the lower end serve as stops to retain the sleeve in position within the bore. The sleeve 34 is provided with the substantially square bore 33 to receive the spindle rod 30 therethrough. Two sets of three relatively shallow sloping pockets or grooves 41 for the reception of single ball bearings 42, are provided in the outer wall 43 of the sleeve 34, one set of three pockets being located around the outer wall near the top of said sleeve, while the other set of three pockets is located adjacent the bottom of the sleeve. The upper pockets or grooves are formed with a gradually upwardly sloping wall 44, the lower pockets having a gradually, oppositely or downwardly sloping wall 45, for a purpose that will presently be described. An additional ball bearing 46 adapted to ride in two substantially centrally located annular grooves 47 in the wall 43, is held in position therein by means of a spring 48, in turn seated and suitably held in a transverse bore 49 in the gear 12, and serves to position the sleeve within the bore. By referring to Figure 7, it will be noted that the pockets 41 are so positioned that when the sleeve is upwardly or downwardly extended, the outer ends of the gear bore will slightly overlap the pockets and serve as a retaining wall for the disengaged bearings, about to be described, thereby preventing the latter from slipping from their respective pockets.

In normal inoperative position the sleeve 34 will extend a relatively short distance above the upper surface of the gear. When the jacking apparatus has been operatively connected with the rotating crank shaft in a manner hereinafter described, the gear 12 will rotate to the right to lower the jack, whereupon the lower ball bearings 42, seated in the downwardly sloping pockets 45, are caused to contact with and grip the wall of the bore whereby the sleeve will rotate with the gear thus moving the drive spindles downwardly and lowering the telescopic screws. Upon full extension of the spindle rods, the stop or flange 35 on the upper end of the spindle rod 30 will contact with the collar 38 and move the sleeve downwardly, thus moving the lower balls 42 out of engagement with the wall of the gear and permitting the sleeve to freely rotate within the gear. To raise the jack, the gear is driven or rotated to the left, whereupon the upper ball bearings 42 seated in the upwardly sloping pockets 44 are caused to frictionally contact with and grip the wall of the bore and the sleeve will rotate the gear, thus rotating the spindle rods and drawing the telescopic screws up into the jack housing. Upon full withdrawal of the spindle rods, a flange or collar 50 on the upper end of the lower drive spindle 32 will contact the flange of the sleeve 34 and move the same upwardly into its inoperative or original position, thus disengaging the upper balls 42 and permitting the sleeve to freely rotate in the gear.

A rigid portable shaft 51 of suitable length, is adapted to be inserted through the crank opening, not shown, in the front of the vehicle and into locking engagement with the crank shaft 6. The inner end 52 of the shaft has a flexible sleeve 53 suitably secured thereto, formed with slots 54 to insure a tight fit with the crank shaft 6. A series of three downwardly sloping, relatively shallow pockets or grooves 55 are arranged in the outer wall of the shaft in which ball bearings 56 are seated, thus providing a three point lock with the inner wall of the crank shaft 6, when the latter is turned in a clockwise direction, and permitting the shaft 51 to be rotated in the same direction as the crank shaft, that is to the right or clockwise. A substantially T-shaped cylindrical housing 57 threadedly mounted on the outer end of the portable shaft 51 has a bevel gear 58 suitably journalled in the outer end of said housing which intermeshes with a bevel gear 59 suitably journalled in the extended side portion 60 of the housing. A threaded sleeve 61 on the shaft 51 threadedly engages the internal threaded portion 62 in the inner open end of the housing. The outer end 63 of the shaft is provided with a relatively narrow key 64 which interfits with the keyway 65 in the bore of the bevel gear 58, thus locking the gear on said shaft.

A flexible permanently mounted shaft 66 of suitable length, comprising a linked chain 67 having a suitable covering 68, of fabric or the like, is connected to the worm 9 and to a substantially L-shaped clutch plate 81, hereinafter described. Thus the shaft 66 is provided with a substantially short solid coupling rod 69 formed on one end 70 of the linked chain 67, which rod 69 extends through a collar 71 suitably formed on the end of the covering 68, and is adapted to slidably fit in the outer end 72 of the worm shaft 10. An enlarged portion 73 on the rod 69, is partly cut away to form a substantially V-shaped key portion 74, and is adapted to engage a correspondingly shaped recessed portion 75 in the outer end of the worm shaft 10. The other end 76 of the chain 67 is provided with a coupling rod 77 having a collar 78 mounted thereon. A bore 79 in the end of the rod 77 is formed with a substantially V-shaped coupling recess 80. The substantially thin L-shaped clutch or retaining plate 81 previously mentioned has two circular apertures 82 and 83 therein. The collar 78 of the shaft 66 is adapted to be inserted in the aperture 82 and retained in rigid position therein by a set screw 84, and the collar 85 of the similarly constructed flexible shaft 102, suitably positioned along the under side of the chassis, leading to the rear jacks 87 mounted on the rear axle 4, is received in the opening 83 and retained in position therein by the set screw 88.

A second flexible shaft 89 of suitable length, comprising the linked chain 90 having the relatively short coupling rods 91 formed on the end 92 and 93 respectively of the chain, is adapted to operatively connect the flexible shaft 66 with the rigid shaft 51. Collars 94 and 95, suitably mounted on the ends of a fabric covering 96, are adapted to receive the coupling rods 91 therethrough, the rods 91 having enlarged portions 97 formed thereon, partly cut away to form substantially V-shaped keys 98. These keys 98 are adapted to seat in a V-shaped coupling recess 80 in the end of the rod 77 of the shaft 66 to connect the drive shafts with the worm 9 and worm gear 12 of the jack for raising and lowering the jack, and to also seat in a bore 99, and a coupling recess 100 in the outer end 63 of the rigid portable shaft 51 for lowering the jack, or with a recessed V-shaped key lock 101 formed in the bevel gear 59 of the gear housing 57 for raising or withdrawing the jack.

When it is desirable or necesary to change a wheel or tire, the driver of the vehicle will remove the portable rigid shaft 51, and flexible shaft 89 from beneath the vehicle engine hood, or other suitable storage place, insert the flexible sleeve 53 of the portable shaft 51 into the outer end of the crank shaft 6, and fit either one of the coupling rods 91 of flexible shaft 89 into the bore 99 of the rigid shaft 51. The other coupling rod 91 is then fitted into the bore 79 in the outer end of the flexible shaft 66, which is in turn connected up with the worm 9 as described. Thus the rigid shaft 51, linked chains 90 and 67 of the flexible shafts 89 and 66 respectively, will rotate in a clockwise direction, thus rotating the worm 9 and intermeshing gear 12 and causing the jack to be lowered. Upon completion of the repairs, the coupling rod 91 on the end of the flexible shaft 89 is removed or disengaged from the bore 99 and recess 100 in the end of the rigid shaft 51, and fitted into the key recess 101 formed in the bevel gear 59, which gear rotates to the left thus reversing the rotation of the flexible chains and causing the gear 12 to be rotated to the left or in an anti-clockwise direction, whereby the spindle rods and telescopic screws are withdrawn into the jack housing and the vehicle lowered. All these operations are carried out while the motor is running, it being unnecessary to shut off the motor until the jacking operation has been completed. The shafts 51 and 89 will of course be replaced in their storage compartment under the hood when repairs have been completed.

In order to operate the rear jacks 87 on the rear axle 4 it is of course necessary to fit the end 91 of the flexible shaft 89 into a bore 103 and a coupling recess 104, in the end of a flexible chain 105 of the flexible shaft 102. The worm and gear in the rear jack housing 87 will then be operated in a similar manner to the front jack.

While the operation of a single unit or jack of the jacking system has been described it is of course understood that the remaining jacks are similarly constructed and will be operated in precisely the same manner. It will of course be understood that the flexible shaft 89 must be connected with the particular jack unit to be operated.

While I have in the present instance, shown and described preferred embodiments of my invention which will give in practice satisfactory and reliable results, it is to be understood that the same are susceptible of modification in various particulars without departing from the spirit or scope of the invention or sacrificing any of its advantages.

Having thus described my invention, what I claim is:

1. A jacking apparatus of the character described comprising a jack mounted on an axle, said jack having a series of telescopic screw members therein, a geared driving mechanism seated in said jack, telescopic drive means connected to said geared mechanism and said telescopic screw members and sliding means positioned in said geared mechanism and connected with said telescopic driving means for rendering said driving means inoperative upon completion of the lifting and lowering operations.

2. A jacking apparatus of the character described comprising a jack housing mounted on an axle, a geared driving mechanism in said housing, a series of telescopic screws having telescopic drive members connected therewith for connecting said screws with said geared mechanism, and tubular sliding means in said geared mechanism, and connected with one of said telescopic driving members for rendering said driving members inoperative upon completion of the lifting and lowering operations.

3. A jacking apparatus of the character described comprising a jack housing positioned on an axle, said jack housing having a worm and gear driving mechanism arranged therein; a series of telescopic sleeves in said housing, said sleeves having a driving member therefor for connection with said worm and gear mechanism, a sliding member associated with said gear and driving member for rendering the driving connection with said gear inoperative upon completion of the lifting and lowering operations.

4. A jacking apparatus of the character described comprising a jack housing positioned on an axle, said jack housing having a worm and gear driving mechanism arranged therein, a series of telescopic lifting sleeves in said housing, said sleeves having a series of driving members therefor for driving connection with said worm and gear mechanism, a movable tubular member in said gear connected with said driving members, said tubular member being drivingly connected with said gear whereby said driving connection will be rendered inoperative upon completion of the lifting and lowering operations.

5. A jacking apparatus of the character described comprising a jack housing positioned on an axle, said housing having a worm and gear driving mechanism arranged therein, a series of telescopic lifting sleeves in said housing, said sleeves having a series of driving members therefor for driving connection with said worm and gear mechanism, a movable tubular member in said gear connected with said driving members, means in said tubular member for rendering the driving connection with said gear driving mechanism inoperative upon completion of the lifting and lowering operations.

6. A jacking apparatus of the character described comprising a jack housing positioned on an axle, said housing having a worm and gear driving mechanism arranged therein, a series of telescopic sleeves in said housing, telescopic drive members associated therewith for connection with said worm and gear mechanism, a sliding rotatable tubular member in said gear, one of said drive members being connected with said tubular member, a series of bearings in said member for engagement with said gear for permitting said worm and gear mechanism to freely rotate upon completion of the lifting and lowering operations.

7. A jacking apparatus of the character described comprising a jack housing, worm and gear driving mechanism arranged therein, telescopic sleeves in said housing, telescopic driving rods therein for connection with said gear, a rotatable sliding sleeve in said gear, one of said driving rods being received in said sleeve, a series of sloping pockets in the wall of said sleeve having bearings therein for engagement with said gear, the driving rod in said sleeve adapted to slidingly move said sleeve for permitting said worm and gear driving mechanism to freely rotate upon completion of the lifting and lowering operations.

FREDERICK SEITZ.